United States Patent [19]
De Marchi et al.

[11] Patent Number: 6,164,891
[45] Date of Patent: Dec. 26, 2000

[54] FEEDING AND DISTRIBUTING DEVICE FOR ROTARY PLATFORMS, PARTICULARLY FOR ROTARY-HEARTH FURNACES

[75] Inventors: Giovanni De Marchi; Giancarlo Grattarola, both of Genoa, Italy

[73] Assignee: Demag Italimpianti S.p.A., Italy

[21] Appl. No.: 09/291,208

[22] Filed: Apr. 14, 1999

[30] Foreign Application Priority Data

Apr. 29, 1998 [IT] Italy .................................. GE98A0032

[51] Int. Cl.[7] .............................. B65G 47/56; F27B 9/16
[52] U.S. Cl. ........................................... 414/160; 414/587
[58] Field of Search .................... 414/160, 177, 414/586, 587

[56] References Cited

U.S. PATENT DOCUMENTS

| | | |
|---|---|---|
| 2,538,556 | 1/1951 | De Coriolis et al. . |
| 3,667,746 | 6/1972 | Makarou et al. . |
| 4,259,181 | 3/1981 | Leon et al. . |
| 4,402,643 | 9/1983 | Lytton et al. ............................ 414/160 |
| 4,457,840 | 7/1984 | Nagl . |
| 4,921,086 | 5/1990 | Klutz et al. . |
| 5,895,215 | 4/1999 | Rinker et al. ....................... 414/160 X |

FOREIGN PATENT DOCUMENTS

| | | |
|---|---|---|
| 0 225 074 | 6/1987 | European Pat. Off. . |
| 578 968 | 7/1933 | Germany . |
| 195 29 925 | 2/1997 | Germany . |
| 1144070 | 3/1969 | United Kingdom . |
| WO 97/33135 | 9/1997 | WIPO . |

*Primary Examiner*—Steven A. Bratlie
*Attorney, Agent, or Firm*—Larson & Taylor, PLC

[57] ABSTRACT

A device for feeding and distributing loose material to rotary platforms, particularly for rotary-hearth furnaces, includes a material feed device, a material transfer device and a material gravity-pour duct. The device further includes a static device for the differentiated distribution of the material. The distribution front of the gravity-pour duct has an essentially curvilinear profile, the derivative of this curve being an increasing linear function of the radius of the rotary platform in the portion lying between the center of the platform and its perimeter.

16 Claims, 6 Drawing Sheets

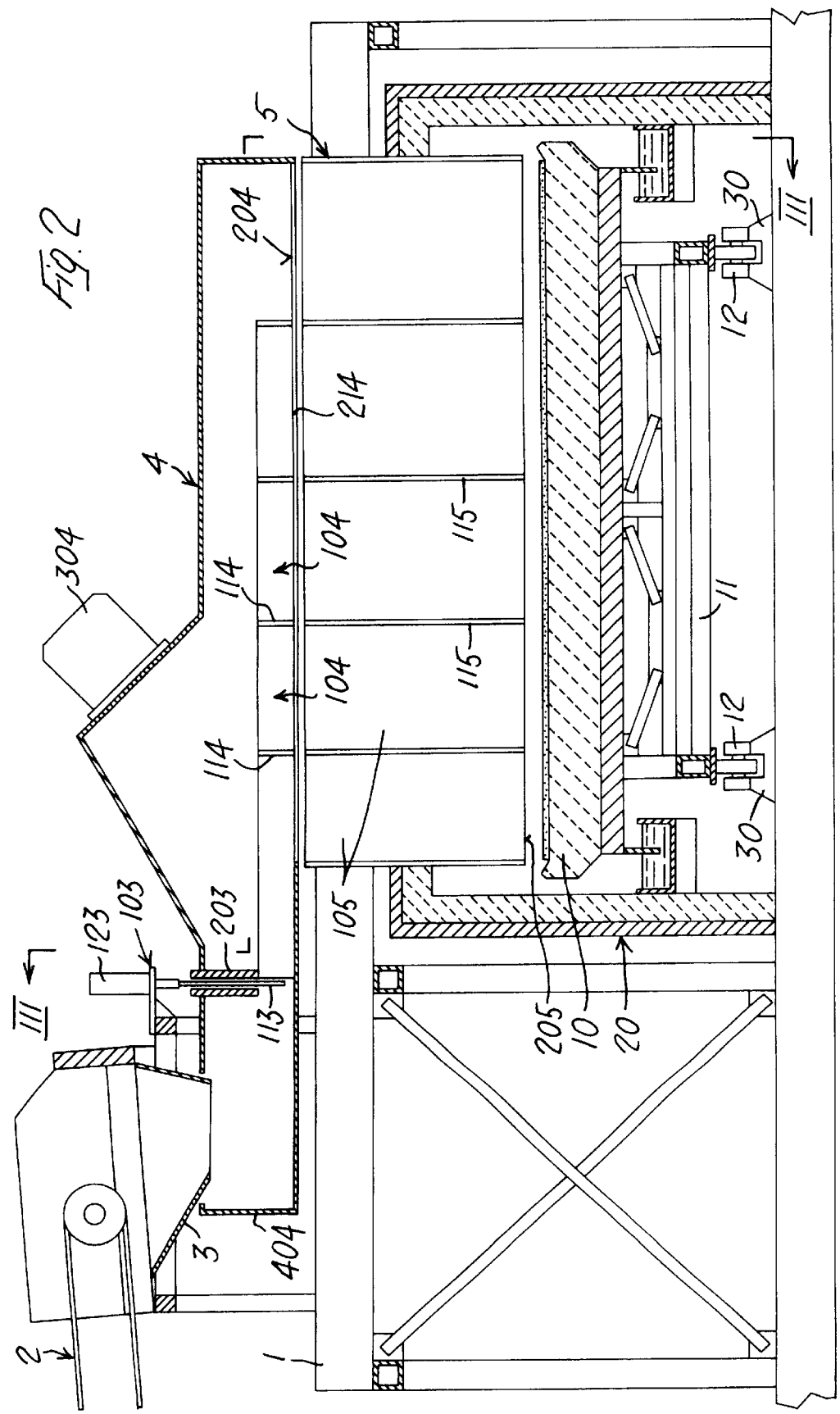

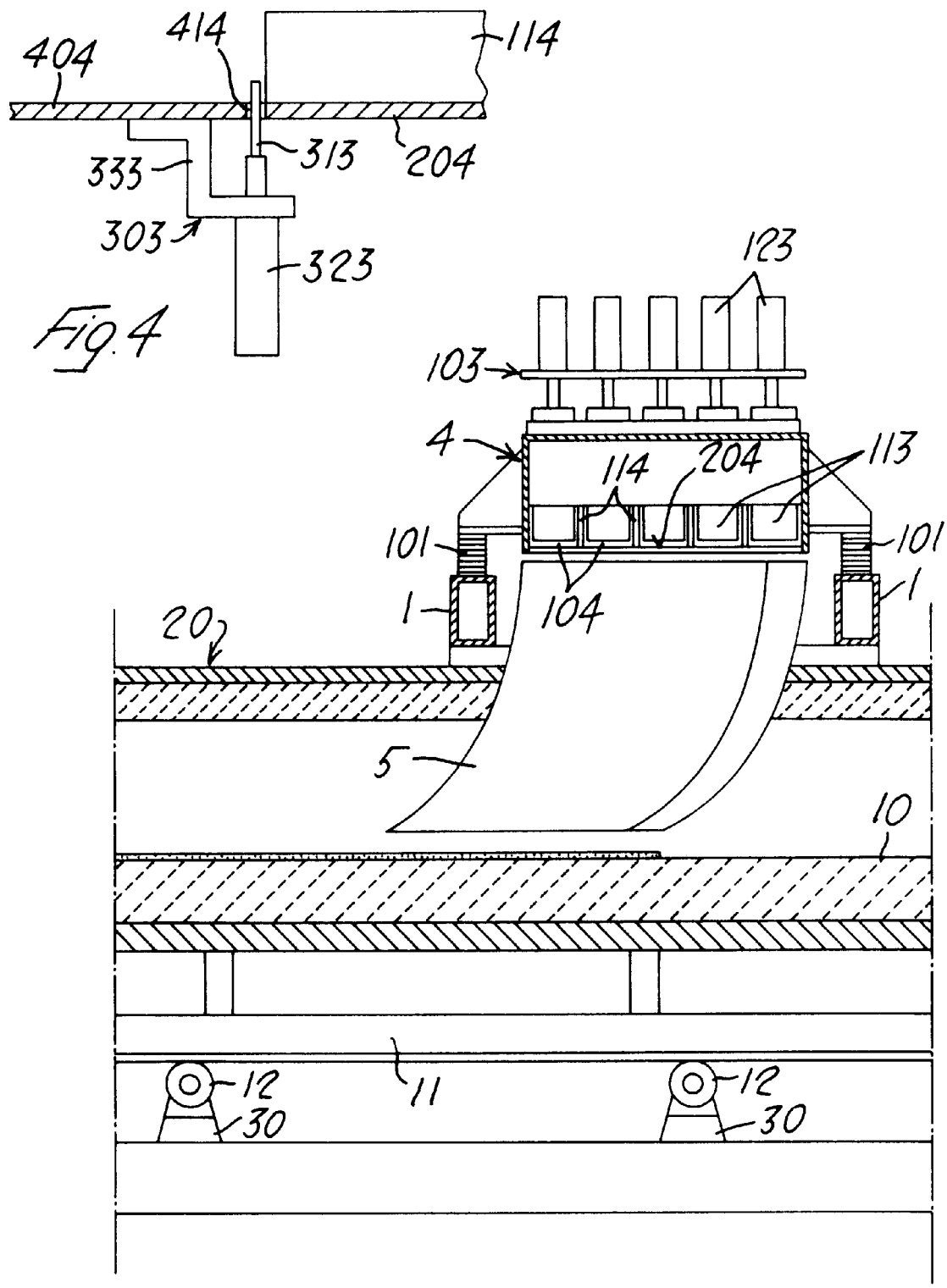

FEEDING AND DISTRIBUTING DEVICE FOR ROTARY PLATFORMS, PARTICULARLY FOR ROTARY-HEARTH FURNACES

TECHNICAL FIELD OF THE INVENTION

The present invention relates to a feeding and distributing device for rotary platforms, and in particular for the feeding and distribution of material in rotary-hearth furnaces.

BACKGROUND OF THE INVENTION

The feeding and uniform distribution of loose material, such as granules, pellets, powders and the like onto continuously moving supports presents a great many problems. In particular, while it may be a relatively simple matter to feed a support such as a straight belt with uniform distribution, greater difficulties are encountered when dealing with the same problem with a rotary platform. This is largely due to the fact that, given a constant material feed speed, the speed of displacement of the rotary platform increases from the center of the platform to its perimeter. Consequently more material will be deposited near the center than near the outer edge.

In certain sectors, such as metallurgy, it is of the greatest importance to achieve equal distribution of the material sent for processing in rotary-hearth furnaces, which present precisely the problems described above. The unsatisfactory distribution of the material can in fact lead to a poorer yield of the process and hence to inferior product quality.

SUMMARY OF THE INVENTION

The object of the present invention is to provide a device for feeding and distributing loose material to rotary platforms which is capable of distributing the material uniformly over the entire useful surface of the platform.

The subject of the present invention is therefore a device for feeding and distributing loose material to rotary platforms, particularly for rotary-hearth furnaces, comprising material feed means, material transfer means and a material gravity-pour duct, characterized in that the said device comprises static means for the differentiated distribution of the material, the means comprising the distribution front of the pouring duct, which has an essentially curvilinear profile, the derivative of this curve being an increasing linear function of the radius of the platform in the portion lying between the center of the platform and its perimeter. Alternatively, the profile of the front may be essentially a series of line segments approximating to the curve described above.

In one embodiment the device comprises material feed adjustment means; in particular the material feed may be varied along the distribution front. The pouring duct may be divided into a plurality of channels having the same cross-section or different cross-sections.

BRIEF DESCRIPTION OF THE DRAWINGS

Further advantages and features of the device according to the present invention will be clear from the following detailed description of an embodiment thereof. This description, which is provided by way of non-restrictive example, refers to the accompanying drawings in which:

FIG. 2 is a sectional view on II—II as marked in FIG. 1;

FIG. 3 is a sectional view on III—III as marked in FIG. 2; and

FIG. 4 is an enlarged detail in longitudinal section of an alternative embodiment of the invention.

DESCRIPTION OF SOME PREFERRED EMBODIMENTS OF THE INVENTION

Figure 1:
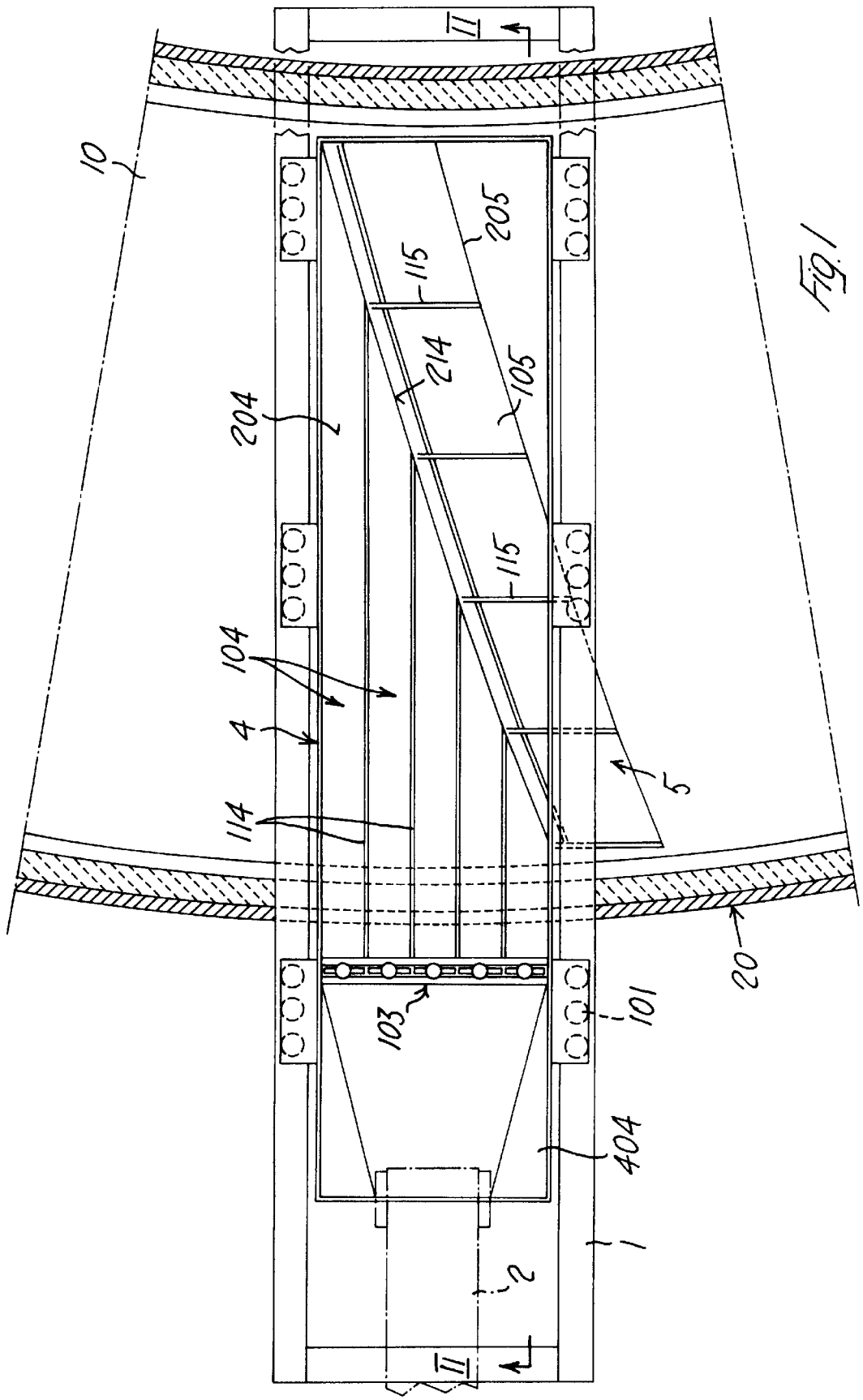
FIG. 1 is a plan view from the top of an embodiment of the device according to the present invention.

FIG. 1 illustrates the feeding and distributing device according to the present invention; the metal lattice support frame 1, on which is mounted the device of the invention, is used in this case to feed the rotary hearth 10 of an ore processing furnace. Mounted on the frame 1, on suitable suspension means 101, is the pouring duct 4, which is divided by the walls 114 into a plurality of channels 104 of equal cross-section. The base 204 of the pouring duct 4 presents a curvilinear distribution front 214; this front 214 pours the material onto the chute 5, the latter also being separated by the walls 115 into a plurality of channels 105; and the distribution front 205 of the chute has a curvilinear profile exactly like that of the base 204 of the duct 4. The material reaches the duct 4 via the feed means, in this case the belt 2 and the hopper 3 which pour the material into the mouth of the duct 4. The flow of material to the duct 4 is regulated by the adjustment means 103.

In FIG. 2 the device is shown in section on II—II as marked in FIG. 1, identical parts having the same numbers. As the figure makes clear, below the hopper 3 the device of the invention comprises a chamber 404 communicating with the pouring duct 4 through the adjustment means 103. These adjustment means comprise gates 113 operated by actuators 123 and capable of reciprocating motion in a track 203 formed in the top of the duct 4. The top also contains the means for transferring the material along the duct 4, in the form of the motor 304, which imparts a constant vibration at a given frequency to the duct 4. The chute 5 is connected to the top of the furnace 20, the hearth 10 of which rotates on a frame 11 whose wheels 12 engage with the tracks 30.

FIG. 3 shows the device in section on III—III as indicated in FIG. 2. The figure shows more clearly the disposition of the adjustment means 103, that is to say the gates 113 at the entrance of the channels 104 formed in the duct 4 by the walls 114. Also visible are the means 101 of suspension of the duct 4 on the support frame 1. Also visible is the chute 5 which is not structurally connected to the device of the invention, although forming an integral part of it.

FIG. 4 shows alternative adjustment means 303 to those described earlier. In this form the gate 313 fits into a slot 414 formed in the base of the chamber 404 at the end of the said chamber nearest the duct 4. The gate is mounted on a bracket 333 attached to the chamber 404, and is operated by an actuator 323.

The operation of the feeding and distributing device according to the invention will now be explained. The material that is to be distributed on the rotary platform, in this case the rotary hearth 10 of a furnace for metallurgical processes, is fed to the hopper 3 by the belt conveyor 2. The hopper deposits the material in the chamber 404, from where, under the propulsive effect of the vibrations generated by the motor 304, it enters the pouring duct 4.

The pouring duct 4 has a base 204 whose outlet edge, the distribution front 214, has an essentially curvilinear profile. The type of curve used for the profile of the front 214 is determined as a function of the width of the platform onto which the material is to be distributed. The choice is made on the basis of the fact that uniform distribution of the material is related to the different peripheral speed of the platform, which increases from the center of the platform towards its perimeter. This has the consequence that a straight distribution front would create an accumulation of material towards the center and deposit less material towards the perimeter.

To provide a distribution front that will ensure a uniform layer of material over the whole surface of the hearth, the curve in question must be, to a first approximation, a curve whose first derivative is a linear function of the radius of the rotary platform. In practice, this curve may, for the portion in which we are interested, be approximated to a polynomial of the second degree, such as an arc of an ellipse, an arc of a circle or a segment of a parabola. In an extreme case, the profile of the front 214 could also be a series of straight line segments tangential to the curve at particular points set appropriate distances from one another.

As can be seen in the figures described above, the duct 4 is divided into a plurality of channels 104 by the equidistant walls 114. This division facilitates the transport of the material along the duct 4 and in effect separates the distribution front 214 into a series of mouths whose sizes diminish from the inward side of the hearth 10 to its perimeter. In the same way the chute 5 that deposits the material on the surface of the hearth 10 must be formed in such a way that its outlet edge 205 is curvilinear like the distribution front 214 of the duct 4. The chute 5 need not necessarily be used, depending on the positioning of the device of the invention relative to the rotary platform. In principle, the duct 4 could be positioned immediately above the surface of the platform, in which case there would be no need for the chute.

Between the chamber 404 and the pouring duct 4 are the feed adjustment means 103 consisting of gates 113 controlled by actuators 123 positioned at the entrance to each of the channels 104 into which the duct 4 is divided. These adjustment means 103 permit further control over the distribution of the material, so that the operation of the device can be adapted to the specific requirements of the platform equipped therewith. The positions of the individual gates 113 is determined, in practice, during installation, and in accordance with the particular material, and hence also in accordance with the material feed speed. As illustrated in FIG. 4, a similar solution can be provided by positioning gates 313 on the base of the chamber 404. The control effect on the distribution of the material across the crosssection of the duct 4 is precisely the same as that achieved with the adjustment means 103 shown in FIGS. 1 to 3.

In principle, of course, the feed to the individual channels could be varied in exactly the same way by varying the position of the walls inside the duct, so that the channels 104 have different cross-sections from each other.

Figure 5:
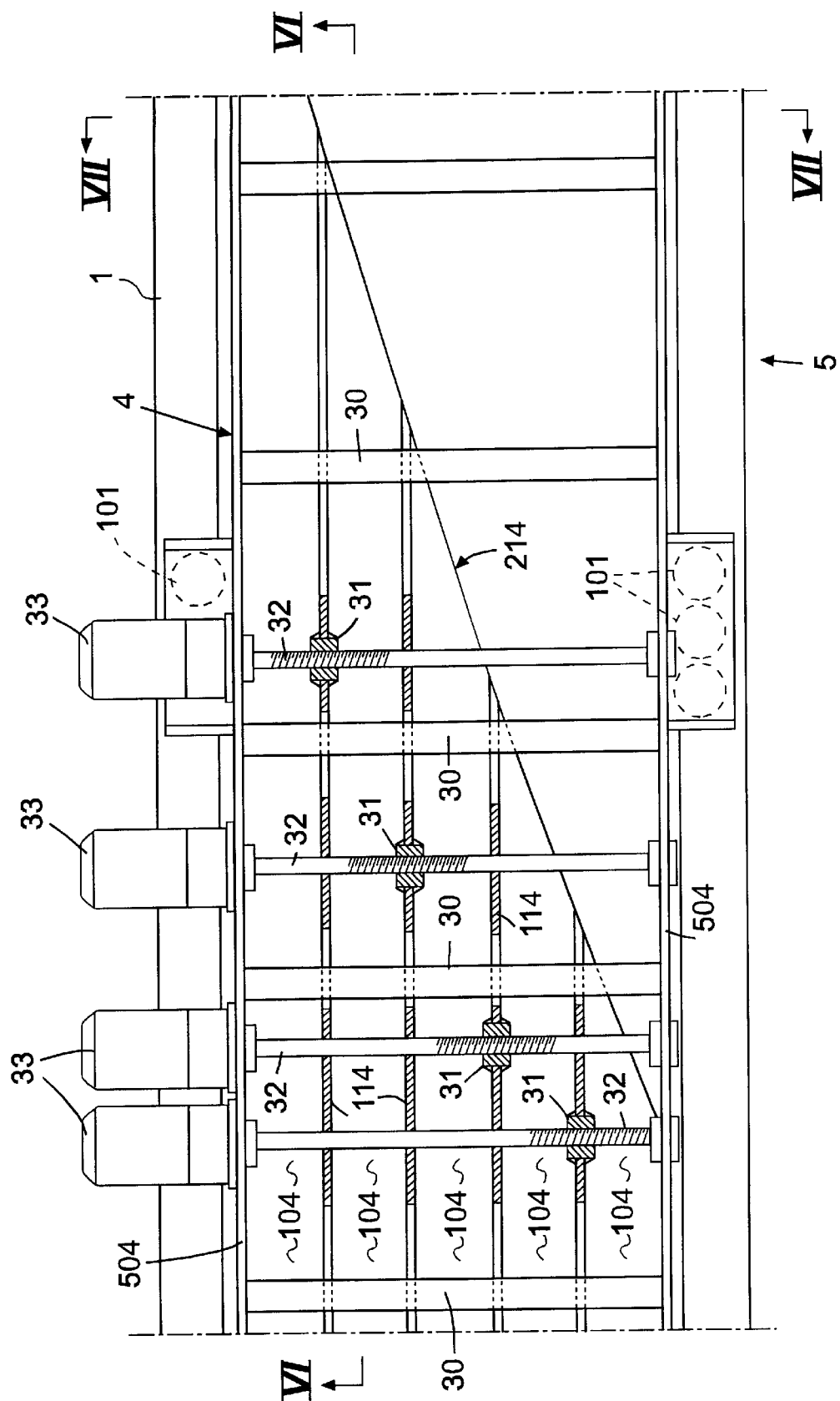
FIG. 5 is a plan view from the top of an embodiment of the device according to the invention showing the means for operating the walls in FIG. 1 in detail.
Figure 6:
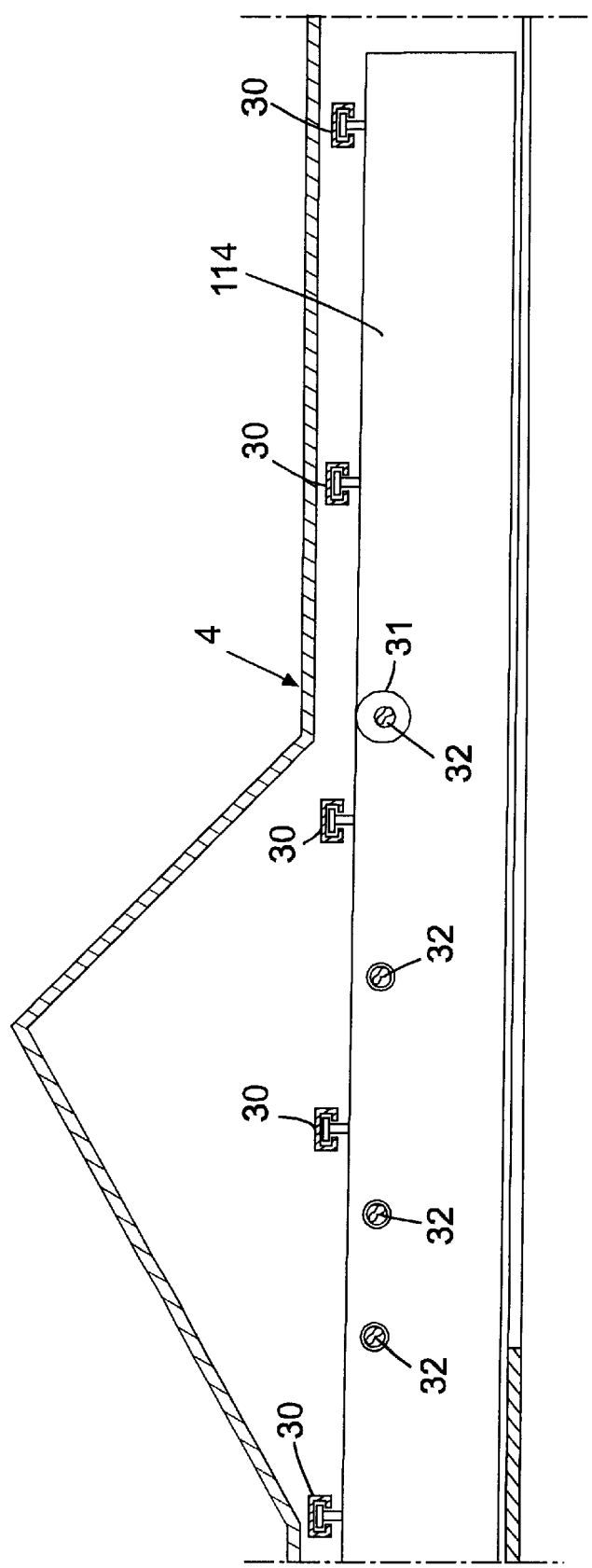
FIG. 6 is a sectional view through line VI—VI in FIG. 5.

As shown in FIGS. 5 and 6, the walls 114 that divide the pouring duct 4 into channels 104 are suspended and slidably supported by superposed guide bars 30 which extend transversely to the pouring duct 4 and are fastened to the side walls 504 of the duct 4. Each wall 114 has a hole, in which a nut 31 is fastened. Through the nut 31 of each wall 114 a threaded actuating rod 32 is screwed, which extends transversely to the pouring duct, i.e., is parallel to the guide bars 30 and is rotatably supported by the side walls 504 of the duct 4. Each actuating rod 32 can be rotated in both directions by an associated electric motor 33. By rotating the actuating rods 32 the walls can be moved back and forth with respect to the base 204 of the pouring duct 4.

Figure 7:
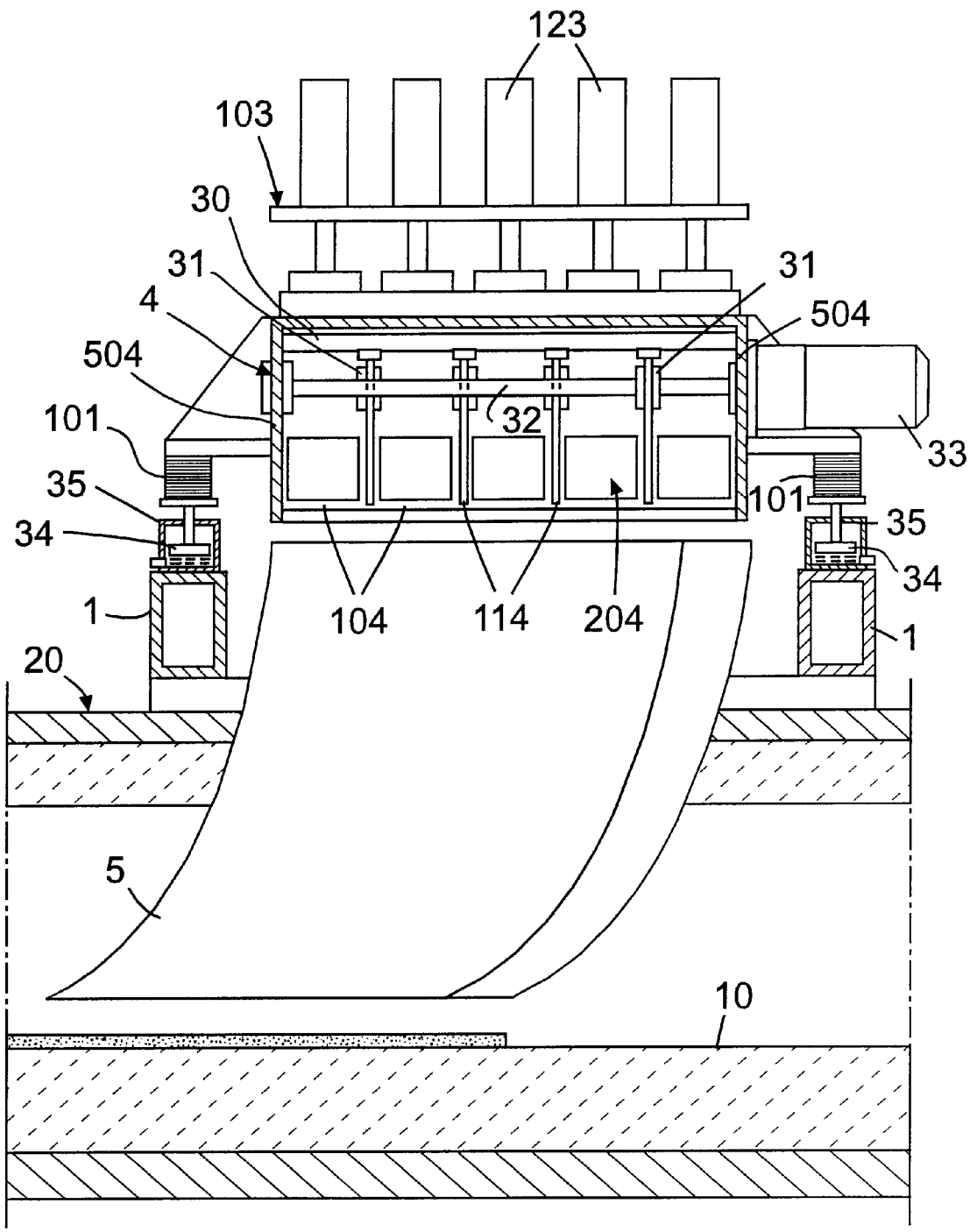
FIG. 7 is a sectional view along line VII—VII in FIG. 5.

Optionally, in order to allow greater control of the distribution of the material over the surface of the rotary platform means, not illustrated in the accompanying figures, may be provided for adjusting the tilt of the plane of the base 204 of the pouring duct relative to the plane of the platform. FIG. 7 shows the suspension means 101 of the pouring duct 4 which bears on pistons 34 of the hydraulic cylinders fastened to the support frame 1. By moving the pistons 34 upwards and downwards, the tilt fo the plane of the pouring duct 4 can be adjusted relative to the plane of the rotary platform 10.

The speed at which material is fed to the hearth 10 is controlled by the motor 304, which imparts the vibration to the duct 4. The vibration frequency will be constant for a given type of material, and will be proportional to the speed of rotation of the platform over which the material is to be distributed.

Advantageously, the complete duct 4 is mounted on the frame 1 via suspension means 101 capable of absorbing the vibrations of this duct, and the duct 4 is separated from the structure of the furnace 20. This type of arrangement is in fact extremely important when feeding and distributing material to rotary-hearth furnaces as in the case illustrated, because the internal walls of the furnace are lined with refractory material which would have poor tolerance to the vibrations generated by the motor 304. Likewise, for this same reason, the chute 5 through which the material is deposited on the hearth 10 of the furnace is independent of the frame 10 and is connected instead to the top of the furnace.

The feeding and distributing device constructed as above is therefore capable of ensuring uniform distribution onto rotary platforms, such as in particular the hearths of furnaces for metallurgical processes, and is also adaptable with satisfactory results to the needs of the individual platform on which the device is installed.

What we claim is:

1. Device for feeding and distributing loose material to rotary platforms comprising material feed means, material transfer means and a material gravity-pour duct divided into a plurality of channels by a plurality of walls, the device comprising static means for the differentiated distribution of the material, the static means comprising the distribution front of the pouring duct, said distribution front being a curve having an essentially curvilinear profile and being continuous and common to all of said channels, the derivative of the curve being an increasing linear function of the radius of the rotary platform in the portion lying between the center of the platform and its perimeter.

2. Device according to claim 1, wherein the profile of the distribution front is essentially a series of line segments, the segments being tangents, at given points set at appropriate distances from one another, curve.

3. Device according to claim 1, wherein the pouring duct is arranged approximately radially with respect to the rotary platform.

4. Device according to claim 1, wherein the duct is arranged on a plane approximately parallel to the plane of the rotary platform, and operates in conjunction with a chute having an outlet edge positioned close to the surface of the platform and a curvilinear profile substantially analogous to the profile of the distribution front of the pouring duct.

5. Device according to claim 1, wherein the plurality of walls are fixed to the base of the duct.

6. Device according to claim 4, wherein the chute is divided by a plurality of walls into a plurality of channels, the channels of the chute being of same cross-section as the mouths of the channels of the duct.

7. Device according to claim 1, further comprising material feed adjustment means.

8. Device according to claim 7, wherein the feed adjustment means comprise means for operating the walls that divide the pouring duct into channels.

9. Device according to claim 7, wherein the material feed adjustment means comprises dynamic means for the differentiated feeding of the material across the cross-section of the pouring duct, the dynamic means being positioned between the duct and the feed means.

10. Device according to claim 9, wherein the dynamic means comprise a plurality of gates having suitable mutually-independent operating means and positioned so as to control the entrance to each of the channels into which the duct is divided.

11. Device according to claim 10, wherein the gates fit into a slot formed in the base of the pouring duct.

12. Device according to claim 10, wherein the gates fit into a slot formed in the top of the pouring duct.

13. Device according to claim 1, characterized in that the device is mounted on a support frame via suitable suspension means.

14. Device according to claim 1, wherein the material transfer means comprise one or more vibrator means on the top of the duct, towards the end nearest the feed means.

15. Device according to claim 1, further comprising means for adjusting the tilt of the plane of the duct relative to the plane of the rotary platform.

16. Device according to claim 4, wherein the chute is integral with the structure of the rotary platform and independent of the support frame of the device.

* * * * *